H. L. SCOTT.
STRETCH MEASURING DEVICE FOR TESTING MACHINES.
APPLICATION FILED JULY 6, 1915.

1,190,596.

Patented July 11, 1916.

Witnesses.
S. W. Sisson
A. F. Macready

Inventor
Henry L. Scott

By Howard E. Barlow
Attorney

UNITED STATES PATENT OFFICE.

HENRY L. SCOTT, OF PROVIDENCE, RHODE ISLAND.

STRETCH-MEASURING DEVICE FOR TESTING-MACHINES.

1,190,596.  Specification of Letters Patent.  Patented July 11, 1916.

Application filed July 6, 1915. Serial No. 38,076.

*To all whom it may concern:*

Be it known that I, HENRY L. SCOTT, a citizen of the United States, and resident of the city of Providence, in the county of Providence and State of Rhode Island, have invented certain new and useful Improvements in Stretch-Measuring Devices for Testing-Machines, of which the following is a specification.

This invention relates to adjustable measuring scales adapted more particularly for use in obtaining the stretch of material during a testing operation in a testing machine, and the object of this invention is to provide a suitably graduated scale adapted to be connected to the tension element of the tester and arranged to coöperate with means on the resistance element of the tester whereby the relative movement of said elements is caused to indicate on the scale the net stretch of the goods being tested.

A further object of the invention is to make the measuring scale in the form of a flexible tape and to provide a spring actuated reel on which the tape is automatically wound when not in use.

With these and other objects in view, the invention consists of certain novel features of construction, as will be more fully described, and particularly pointed out in the appended claims.

Figure 1:
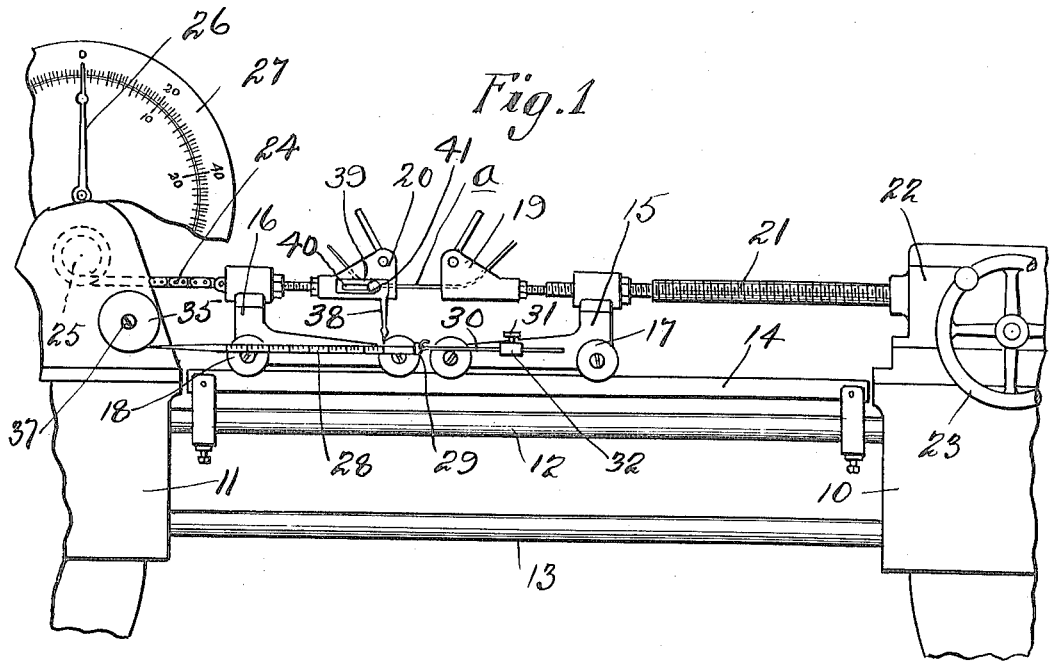
Figure 2:
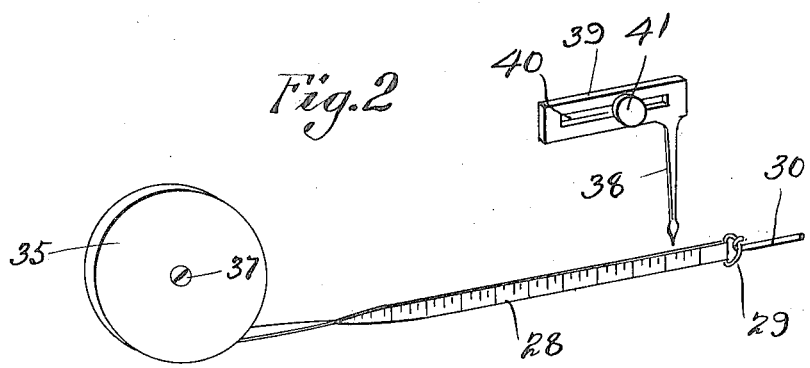
Figure 3:
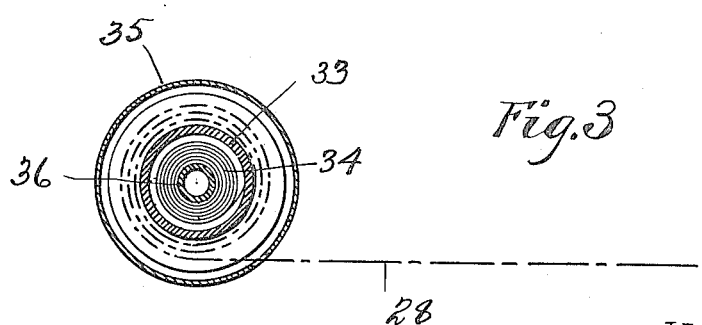

In the accompanying drawings: Figure 1— is a side elevation showing a horizontal type of testing machine to which my measuring tape is applied. Fig. 2— is a perspective view illustrating the reel casing and the flexible tape as drawn out therefrom. Fig. 3— is a central sectional side elevation through the casing, showing the spring acting on the reel on which is wound the tape.

Referring to the drawings 10 and 11 designate the opposite end frame members of a horizontal type of testing machine, which frames are connected by tie rods 12 and 13. In this view, I have also shown one of the rails 14, on the edge of which the tension carriage 15 and the resistance carriage 16 are mounted to roll on their wheels 17 and 18 respectively. On the tension carriage 15 is mounted the clamp 19 and on the resistance carriage is mounted the clamp 20 between which is held the strip of material *a* to be tested. The tension is applied to this strip, through the tension elements carried by the carriage, by the large screw 21 which is drawn endwise by means of suitable gearing (not shown) within the casing 22, the same being operated either by the hand wheel 23 or other suitable power driven means, and the resistance to this tension is applied to the elements mounted on the carriage 16 which act through the chain 24 upon the resistance hub 25. This hub is controlled in its rotation by resistance means such as weights, springs or the like as illustrated and described in my co-pending application of even date herewith. This hub is also connected by means shown in said co-pending application for operating upon the pointer 26 to move the same over the graduated dial 27 for the purpose of indicating or showing the tension which is being applied to the goods.

In some cases it is found of great importance to be able to determine the stretch of the goods as well as their tensile strength while the tension is being applied thereto. It is also found of great advantage to be able to so arrange this stretch indicating mechanism whereby the net stretch can be observed by a direct reading on the scale. To accomplish this, I have provided a scale or graduated member 28 which in this case is shown to be a flexible graduated tape, one end of which is provided with a loop 29 adapted to engage the hook end of the rod 30, which latter is adjustably secured to the tension carriage 15 by the binding screw 31 passing through the bearing 32. This tape as is shown in Fig. 3 is wound upon a drum or reel 33 which is acted upon by means of the spiral spring 34 to exert a tension upon the tape to draw it into the casing 35 and wind it upon the reel.

The reel and casing are provided with a hollow central hub 36 through which a screw 37 is passed for the purpose of securing the same to any convenient portion of the machine to which the device is applied. In some cases it may be attached to the carriage 16 of the resistance element if desired, while in other cases it may be attached as shown in Fig. 1 to the frame of the machine, or other convenient place. A pointer 38 or other suitable member is mounted on the clamp 20 of the resistance element and has a body portion 39 slotted at 40 and held in position by the screw 41 whereby it may be adjusted longitudinally for the purpose of conforming to the setting of the graduated tape.

In the operation of my improved device when it is desired to obtain the amount or extent of stretch of the goods being tested, the tape is drawn out by the operator and the eye 29 passed over the hook rod 30. After the material to be tested has been placed in position in the clamps, the same is drawn out taut through the screw 21, the pointer 38 now indicates zero on the tape and the pointer 26 indicates zero on the dial 27. Now as the tension is applied the stretch of the goods permits the carriage 15 to move a little faster than the resistance carriage 16 and the difference of these relative movements is the stretch of the goods which is indicated by the pointer moving over the graduated surface of the tape or scale. After the strength of the material has been determined by the dial 27 and the stretch of the material by the tape 28, the test is completed and the carriages returned for another operation. In some instances when it is desired to obtain the strength of the goods only, the eye 29 is released from the hook 30 and the tape is drawn into its casing by the spring operated reel and remains housed and out of the way and yet in readiness for instant service when again required. I have also shown the tape or scale as applied to a horizontal type of testing machine but the same is equally well adapted to be applied to the vertical type of testing machine if desired.

Another feature of this invention is that by mounting the scale on the frame of the machine and connecting it to the tension element, the scale is drawn outward without affecting the reading on the tension recording mechanism.

I have shown and described one form of graduated scale or tape as applied to a testing machine for obtaining the stretch of the goods but any form of flexible graduated tape or any tape or scale which is carried on parts of the machine other than the resistance element by which the relative movement of the different elements of the machine may be measured will fall within the spirit and scope of my invention.

I claim:

1. In a testing machine, a tension element, a resistance element, a graduated flexible tape adapted to be connected to the tension element and a member on the resistance element coöperating with said tape whereby the relative movement of said elements is indicated by direct reading upon said tape to show the net stretch of the goods under tension.

2. In a testing machine, a tension element, a resistance element, a scale adapted to be releasably connected to the tension element, and a pointer on the resistance element whereby the relative movement of said elements is indicated by direct reading upon the scale to show the net stretch of the goods under tension, and means for housing the scale when not in use.

3. In a testing machine, a tension element, a resistance element, a flexible scale adapted to be releasably connected to and moved by said tension element, a member on the resistance element coöperating with said scale whereby the relative movement of said elements causes said scale to show the net stretch of the tested goods, and a reel carried by the machine on which the scale is wound.

4. In a machine of the character described, a tension element, a resistance element, a graduated flexible tape adapted to be connected to and moved by said tension element, a member on the resistance element coöperating with the graduations on said tape whereby the relative movement of said elements is caused to indicate by direct reading on the tape the stretch of the goods being tested and a spring actuated reel carried by the machine on which the tape is wound.

In testimony whereof I affix my signature.

HENRY L. SCOTT.